United States Patent
Trinks et al.

(10) Patent No.: US 7,334,980 B2
(45) Date of Patent: Feb. 26, 2008

(54) SPLIT RING RETAINER FOR TURBINE OUTER AIR SEAL

(75) Inventors: Steven W. Trinks, Wallingford, CT (US); Steven G. Lemieux, South Windsor, CT (US); Gregory E. Reinhardt, South Glastonbury, CT (US)

(73) Assignee: United technologies Corporation, Hartford, CT (US)

( * ) Notice: Subject to any disclaimer, the term of this patent is extended or adjusted under 35 U.S.C. 154(b) by 502 days.

(21) Appl. No.: 11/091,204

(22) Filed: Mar. 28, 2005

(65) Prior Publication Data

US 2006/0216143 A1    Sep. 28, 2006

(51) Int. Cl.
F01D 11/02    (2006.01)

(52) U.S. Cl. .......................................... 415/1; 415/230

(58) Field of Classification Search ............. 415/173.3, 415/174.2, 230, 231, 1; 277/370, 372–375, 277/421, 637
See application file for complete search history.

(56) References Cited

U.S. PATENT DOCUMENTS 4,349,318 A * 9/1982 Libertini et al. ........ 416/220 R
5,320,492 A * 6/1994 Bouru et al. ............. 416/220 R

* cited by examiner

Primary Examiner—Ninh H. Nguyen
(74) Attorney, Agent, or Firm—Marjam Muldoon Blasiak & Sullivan LLP

(57) ABSTRACT

A retainer for securing the outer air seal assembly of a turbine rotor stage in a locked position. The outer air seal is suspended from the turbine casing over the rotor stage and is locked to the casing by annular segmented locking keys. A series of circumferentially spaced seats are located upon the front face of the locking key segments with the outer surfaces of the seats describing a circle approximating a first diameter. A split ring retainer is slidably carried in a radially disposed groove and is arranged to secure the key segments in a locked position. A series of lugs extend inwardly from the inside wall of the ring. The lugs are circumferentially spaced about the ring with the inner surface of the lugs approximating a circle having a second diameter that is less that of the first diameter approximated by the seats. The lugs are spaced so that each lug can be seated upon a seat to flex the ring outwardly in a radial direction and thus secure the key segment in a locking position.

11 Claims, 4 Drawing Sheets

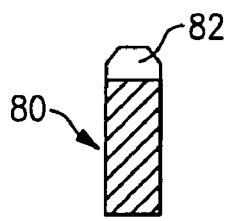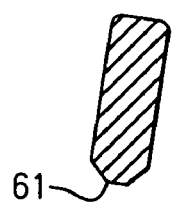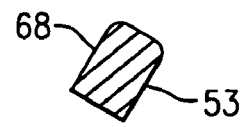
FIG.5  FIG.6  FIG.7
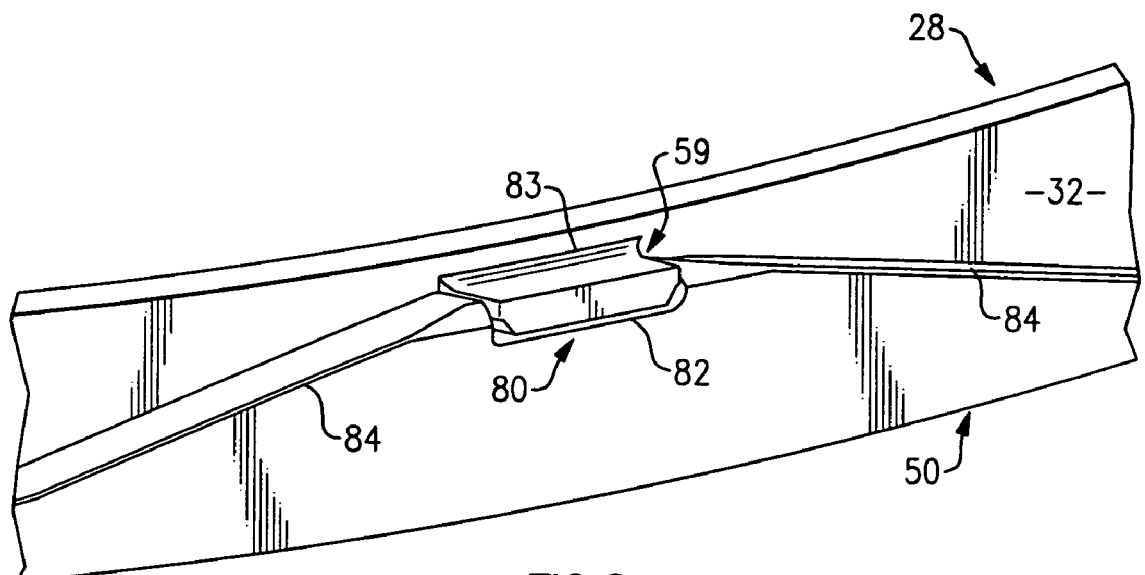
FIG.8
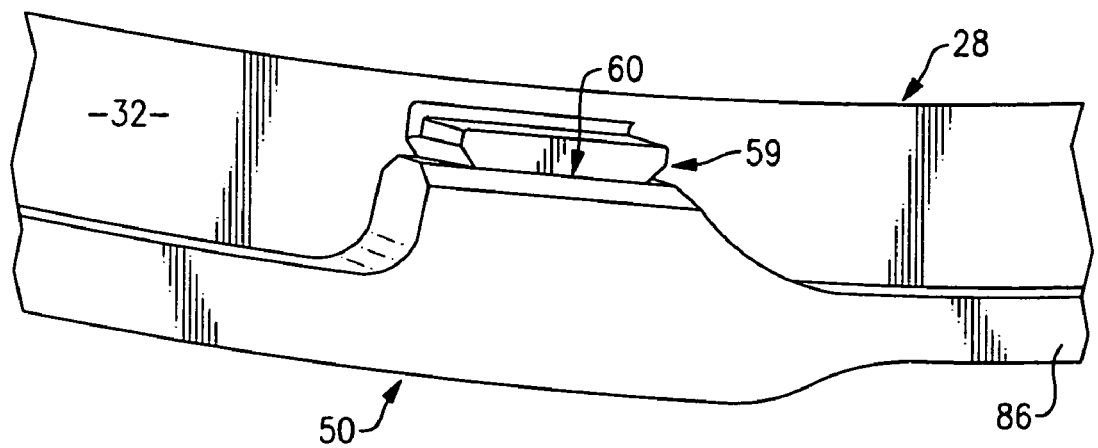
FIG.9

SPLIT RING RETAINER FOR TURBINE OUTER AIR SEAL

STATEMENT OF GOVERNMENT INTEREST

The United States Government has certain rights in this invention pursuant to Contract No. N00019-02-C-3003 between the United States Navy and United Technologies Corporation.

FIELD OF THE INVENTION

This invention relates to a method and apparatus for retaining the outer air seal of a turbine rotor blade stage in assembly.

BACKGROUND OF THE INVENTION

More specifically, this invention pertains to an improved means for retaining the outer air seal of a jet engine turbine rotor stage in assembly. Heretofore, the installation and removal of this type of retainer has been relatively difficult and time consuming when engine maintenance was required, thus extending the aircraft down time. In addition, the air seal retention systems that are in present day use are relatively heavy and costly devices requiring the use of special tools to install or remove from the engine.

Many air seal retainers used in jet engines are loaded in assembly inwardly in a radial direction toward the rotor stage. As a result, thermal loads developed during engine operation can produce further compressive loading upon the retainer causing the retainer to move, which can lead to premature failure of the retention system.

SUMMARY OF THE INVENTION

It is therefore a primary object of the invention to improve turbine air seal systems, and in particular, air seal systems used in jet engines.

A further object of the present invention is to reduce the number of premature failures in jet engine turbine air seal retention systems.

A still further object of the present invention is to reduce the amount of time needed to install and remove a turbine stage outer air seal retainer of a jet engine.

Another object of the present invention is to reduce the weight and the cost of a turbine stage outer seal retainer.

Another object of the present invention is to provide for a more rapid aircraft turn around time during periods of engine maintenance.

Yet another object of the present invention is to provide a turbine outer air seal retainer that can be installed or removed without the need of special tools.

These and other objects of the present invention are attained by a split ring retainer that prevents axial displacement of an annular series of locking key segments which serve to hold the outer air seal assembly of a jet engine turbine rotor stage in locking engagement with the turbine casing. The body of the split ring is slidably contained within a radially disposed groove in the turbine casing and has a series of circumferentially spaced raised lugs located around the inside surface of the ring body. The inner surfaces of the lugs approximate a circle having a first diameter and are adapted to seat upon axially extended ribs located upon each of the key segments. The ribs have seats for receiving the lugs thereon. The seats approximate a circle having a second diameter that is greater than the diameter described by the inner surfaces of the ribs so that the split ring is flexed outwardly when the lugs are seated upon the ribs. When seated upon the ribs, the ring engages each of the key segments to prevent axial movement of the segments and thus retain the segments in a locking position with the outer air seal assembly.

BRIEF DESCRIPTION OF THE DRAWINGS

For a better understanding of these and other objects of the present invention, reference will be made to the following detailed description of the invention which is to be read in association with the accompanying drawings, wherein:

FIG. 5 is a sectional view taken along lines 5-5 in FIG. 4;

FIG. 6 is a sectional view taken along lines 6-6 in FIG. 2;

FIG. 7 is a sectional view taken along lines 7-7 in FIG. 2;

FIG. 8 is an enlarged partial perspective view showing the detent mechanism;

FIG. 9 is an enlarged partial view in perspective showing a raised lug on the split ring in engagement with a rib located upon a locking key segment;

DETAILED DESCRIPTION OF THE INVENTION

Figure 1:
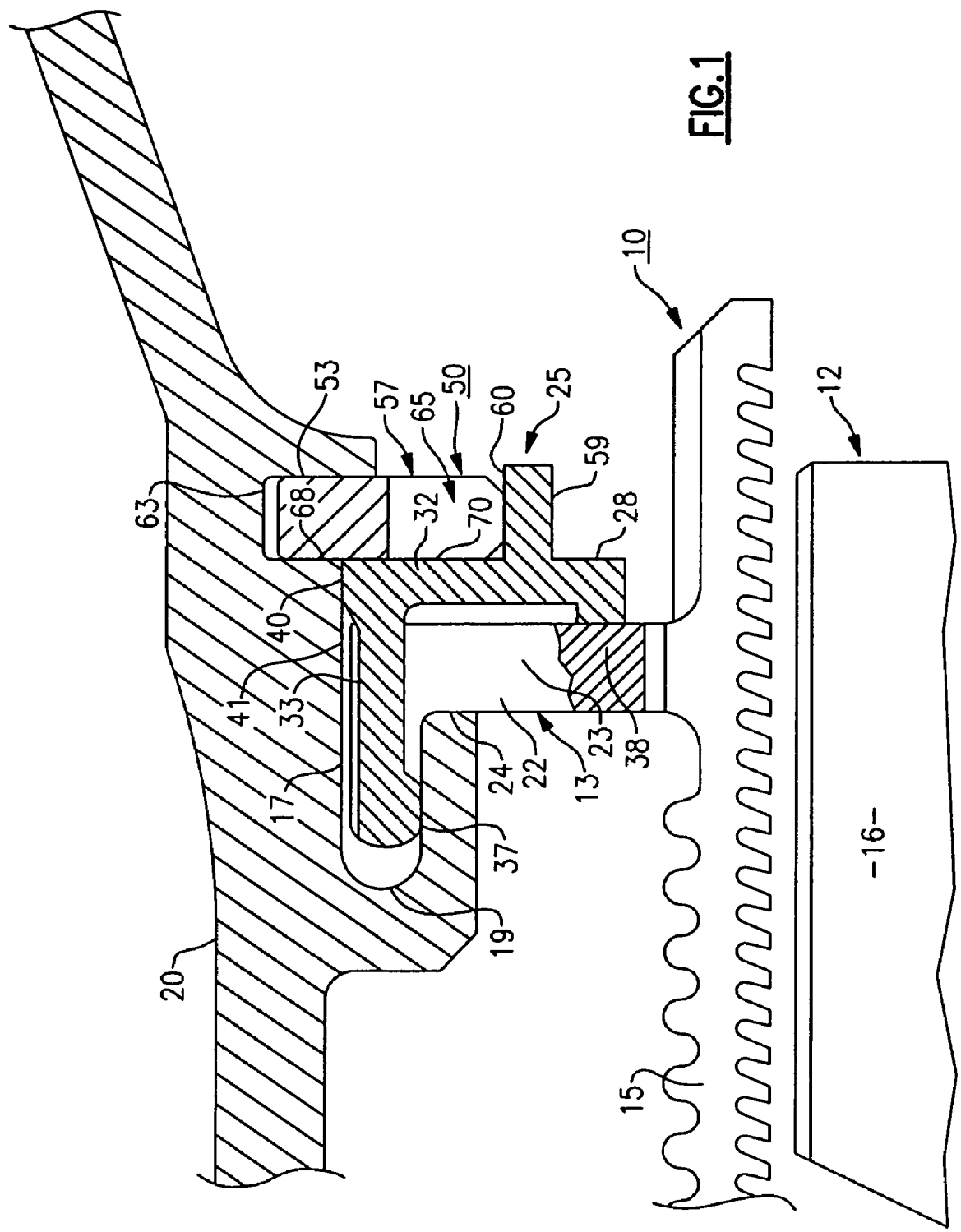
FIG. 1 is a partial side elevation in section illustrating the outer air seal assembly for a turbine rotor stage and a split ring retainer embodying the present invention.
Figure 2:
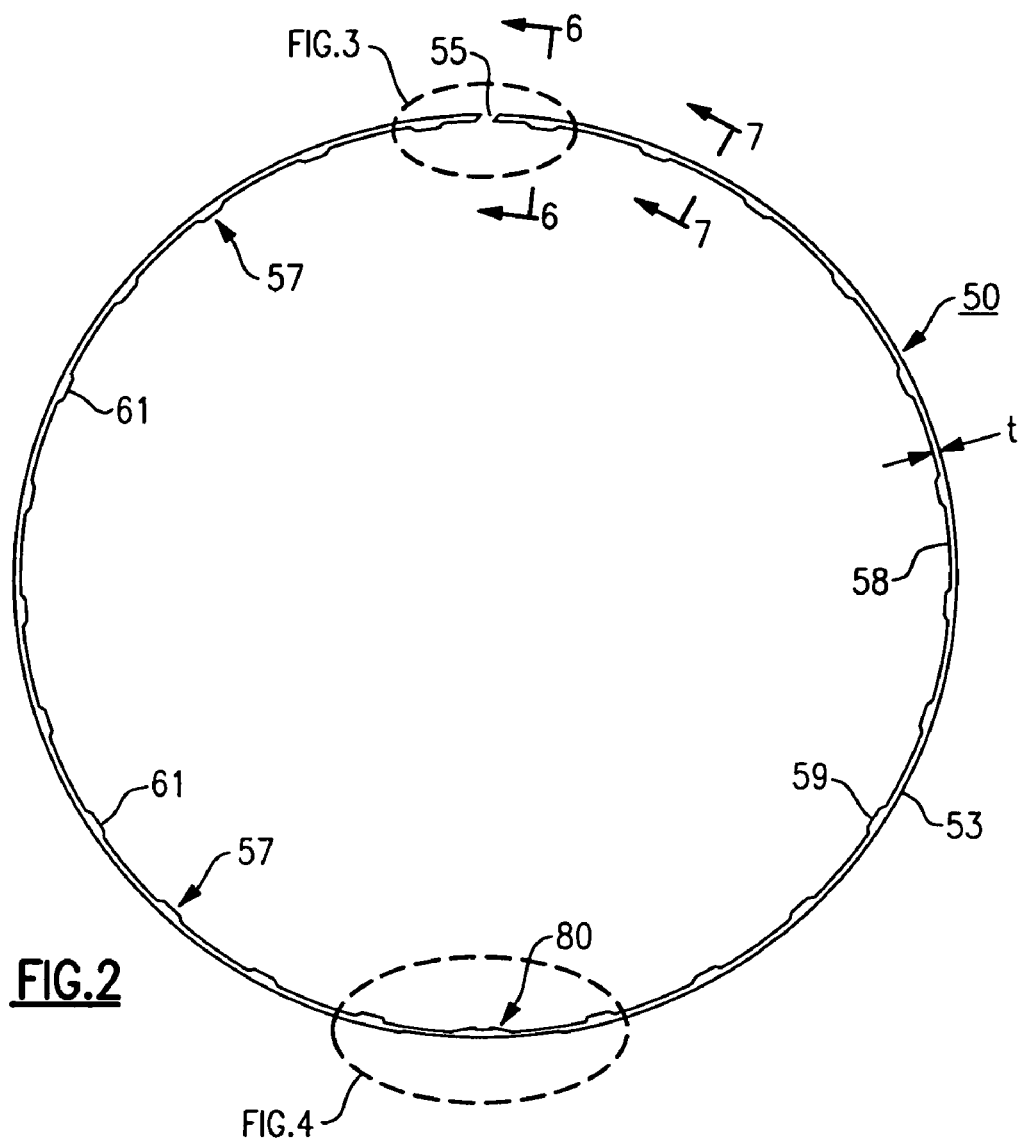
FIG. 2 is a top view illustrating the split ring retainer employed in the present retention system.
Figure 3:
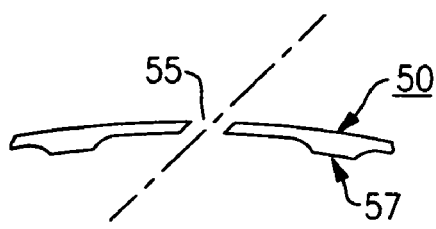
FIG. 3 is an enlarged partial view showing the split section of the ring.
Figure 4:
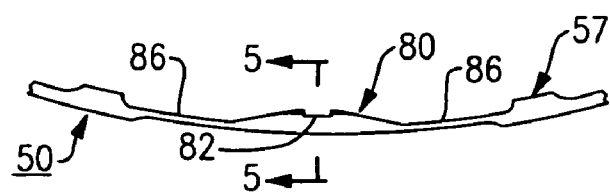
FIG. 4 is an enlarged partial view showing the ring detent mechanism and a section of the ring on each side of detent mechanism.

Referring initially to the drawings, there is illustrated a partial side elevation in section in FIG. 1 showing an annular outer air seal assembly 10 of a turbine rotor stage 12. The seal assembly contains a circular hook-shaped hanger 13 for locating the air seal 15 around the top edges of the blades 16 of the rotor stage. The hanger contains an annular flange 17 that is received within an axially disposed annular groove 19 formed in the turbine casing 20.

The air seal is connected to the annular flange 17 by means of a radially disposed arm 22. One side wall 23 of the arm bears against a radially disposed surface 24 located on the casing to register the air seal in assembly. A locking mechanism, generally referenced 25, serves to secure the air seal in a locked and registered position as illustrated in FIG. 1. The locking mechanism includes a plurality of arcuate-shaped key segments 28. Each key segment includes a radially disposed arcuate-shaped panel 32 having one or more axially extended arms 33. The arms are arranged to pass through openings provided in the air seal hanger into the axial groove 19 contained in the turbine casing 20. A first bearing pad 37 is located upon the outer tip of each arm which rests upon the outer wall of the axially disposed groove 19. A second bearing pad 38 is carried upon the lower inner edge of each panel segment and is arranged to rest against the radial arm of the hangar when the key is in a locking position as illustrated in FIG. 1. A third bearing pad 40 is located upon the upper surface of the key arm at the corner formed by the arm and the arcuate-shaped panel of each locking key. Bearing pad 40 rests against the inner wall 41 of the axially disposed groove 19 when the key is in a locking position. As can be seen, the bearing pads permit the key segments to move axially into the locking position, however, the pads prevent the key segments from rotating in assembly or moving radially once the key is set in the locking position.

A split ring retainer, generally referenced 50, is arranged to prevent the key segments from moving axially out of groove 19 once the key segments are placed in the locking position thus retaining the air seal assembly in the desired operative position around the turbine rotor stage 12.

As further illustrated in FIGS. 2-11, the split retaining ring 50 is generally circular in form. The ring includes a body section 53 having a given thickness (t). The ring contains a split section 55 that is cut at an angle (FIG. 10) that allows the ring to be flexed outwardly when a sufficient outwardly directed force is applied to the ring. The ring is fabricated of a high strength metal having a resiliency such the ring wants to return to its initial unload condition once the flexing force is released. Many types of spring steel are available that provide both this type of high-strength and resiliency.

A series of lugs 57-57 are integrally located upon the inner surface 58 of the ring body. The lugs are circumferentially spaced about the ring body so that each lug on the ring can be seated upon one of a plurality of rib-like seats 59 that extend outwardly from each of the key segments. The outer surfaces 60 on the ribs generally approximate a circle having a first diameter. The inner surfaces 61 of the lugs 57 generally approximate a second circle having a second diameter that is less than the first diameter approximated by the lugs when the ring is in an unloaded condition. Accordingly, the ring must be forced outwardly in order to seat the lugs upon the seats of the key segments as best illustrated in FIGS. 8-11.

Figure 10:
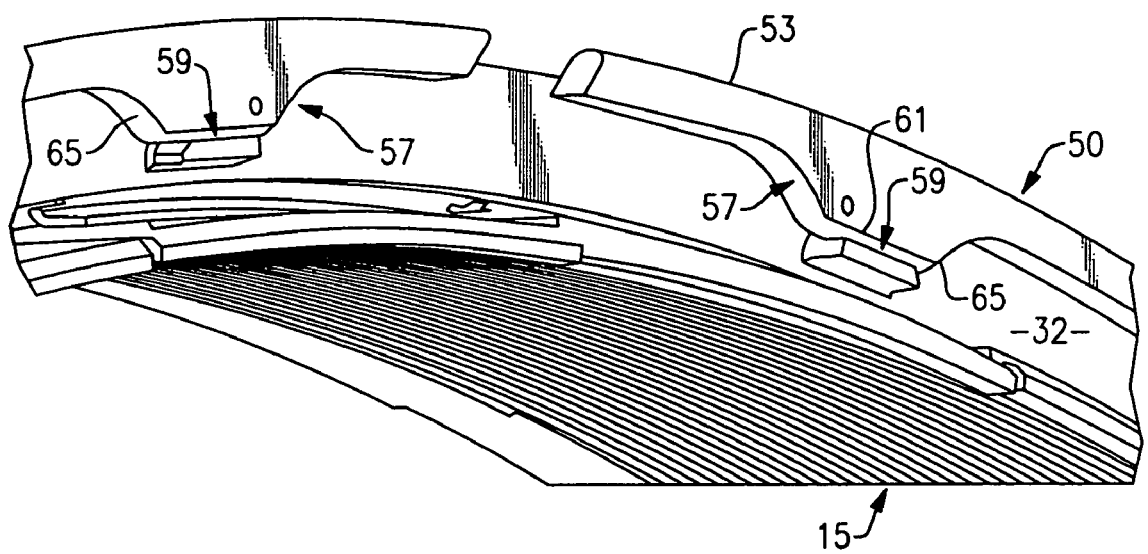
FIG. 10 is an enlarged partial view in perspective showing the split section of the ring and a portion of the outer air seal of a turbine rotor stage.

The body section of the ring is slidably contained within a radially disposed annular groove 63 formed in the turbine casing 20 and surrounds the seats on the key segments so that the ring can move radially in assembly as the lugs are mounted upon the seats. An inclined ramp 65 is located on either side of each lug. To assemble the ring upon the seats of the key segments, the body of the ring is placed over the seat with the lugs being adjacent to the ribs. The ring is then rotated in the groove 63 to guide the seat over the inclined ramps associated with each lug forcing the ring outwardly in a radial direction until the seats are mounted upon the top of each of the lugs. Groove 63 is aligned with each of the locking segments such that side wall 68 of the ring is in contact with the outer wall 70 of each locking segment when the segments are in the locked position. As should now be evident, the expanded ring is now unable to move radially out of the groove 63 in the casing, and correspondingly, the key segments are unable to move axially out of the locking position. The seats on the key segments insure that the split ring will always be loaded radially in an outward direction to prevent the ring from moving inwardly. The ring as illustrated in FIG. 10 is split at an angle to provide a sufficient gap between the angled split surfaces so that thermal expansion of the ring will not produce any additional compressive loading on the ring during engine operation which might otherwise produce thermal jacking of the ring that might result in a premature failure of the ring. The ramp feature also allows the ring to be installed or removed in either a clockwise or a counterclockwise direction without the need of special tools.

A detent mechanism generally referenced 80 (FIG. 8) is furnished to prevent improper installation of the ring. The detent mechanism, as illustrated in FIG. 8, includes a raised platform located on the inside of the ring that is diametrically opposed from the split in the ring. A circumferentially extended recess 82 is located in the top surface of the platform and is dimensioned to snuggly receive therein a keeper 83 which is located on one of the key segments. In practice, a seat as described in detail above may serve as the detent keeper. The detent platform again is furnished with an inclined ramp 84 on either side of seat which facilitates the guiding of the keeper into the recess 82 as the ring is rotated within groove 19. The ramps again allow the ring to be rotated in either direction during installation and removal and serve to minimize galling and wear on the detent mechanisms. The detent mechanism provides a positive tangential locking capability to the ring which resists thermal movement of the ring that might produce an unbalanced load resulting in the ring being fractured and requiring its replacement.

Figure 11:
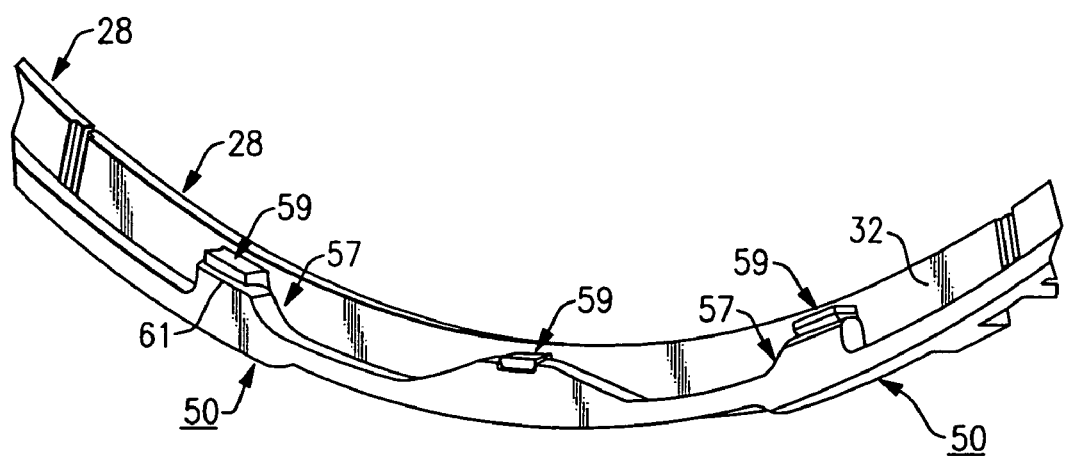
FIG. 11 is an enlarged partial view in perspective showing the detent mechanism that is employed in the practice of the present invention.

With further reference to FIG. 11, a section of the ring body 86 located on either side of the detent mechanism has a reduced thickness which allows the ring to adjust its position upon seats positioned on either side of the detent. This in turn facilitates proper positioning of the seats upon the lugs and allows for closure control over the ring's flexibility.

While this invention has been particularly shown and described with reference to the preferred embodiment in the drawings, it will be understood by one skilled in the art that various changes in its details may be effected therein without departing from the teachings of the invention. Although the seats in this embodiment of the invention are mounted upon the outer face of the key segments, it should be evident that the seat may be mounted upon other components of the turbine such as the turbine casing without departing from the teachings of the present invention.

What is claimed is:

1. A split retaining ring for preventing axial movement of a series of locking key segments for securing the outer air seal assembly of a turbine rotor stage to the turbine casing when the keys are in a locking position, said split ring retainer including:

an annular body that is slidably contained within a radially disposed groove in the turbine casing, said annular body having a split therein whereby the body can be flexed radially in an outward direction within said groove, said body being arranged to engage a series of locking key segments to prevent axial movement of said key segments;

a series of circumferentially spaced raised lugs located upon the inside wall of said annular body, said lugs having inner surfaces that approximates a circle having a first diameter; and said lugs being adapted to mount upon a series of circumferentially spaced seats, said seats having outer surfaces that approximate a circle having a second diameter that is greater than said first diameter whereby the retaining ring is flexed outwardly in a radial direction when mounted upon said seats.

2. The split ring retainer of claim 1 that further includes inclined means associated with each of the lugs for guiding the lugs into seating engagement with the seats as the ring is rotated within said groove.

3. The split ring retainer of claim 2, wherein said ring further includes a detent mechanism for locking the ring in place when the lugs are mounted upon the seats to prevent further rotation of the ring.

4. The split ring retainer of claim 3, wherein said detent means is diametrically opposed with relation to the split in said retaining ring.

5. The split ring retainer of claim 4 wherein the ring body further includes areas of reduced thickness on either side of said detent mechanism.

6. The split ring retainer for claim 2, wherein said inclined means further includes an inclined ramp located on either side of each lug.

7. The split ring of claim 1, wherein said seats are mounted upon the key segments.

8. A method of retaining an outer air seal of a turbine rotor stage to the turbine casing, said method including the steps of:
- mounting a series of circumferentially spaced seats upon movable locking segments that are arranged to retain the outer air seal of a rotor stage in engagement with the turbine casing when said key segments are placed in a locked position, the outer surfaces of said seats approximating a circle having a first diameter;
- providing a retaining ring having a body of a given thickness, said body having a split therein wherein said ring can be flexed outwardly;
- slidably containing said body in a radially disposed groove in the turbine casing so as to prevent axial movement of said locking key when in the locking position;
- locating a series of lugs upon the inside wall of the ring body so that the lugs extend inwardly in a radial direction, said lugs having inner surfaces that approximate a circle that has a second diameter that is less than said first diameter; and
- circumferentially spacing said lugs so that the inner surface of each lug can be mounted upon the outer surface of a rib to flex the ring outwardly in a radial direction.

9. The method of claim 8 that further includes the step of positioning inclined ramps on either side of said lugs and rotating said ring within said groove to guide the seats over said ramps onto said lugs.

10. The method of claim 9 that includes the further step of locating a detent upon said ring which is diametrically opposed to said split in the ring and snap fitting the detent to a keeper on one of said key segments when said lugs are mounted upon said seats to prevent further rotation of said ring.

11. The method of claim 10 that includes the further step of providing areas of reduced thickness in said ring on either side of said detent.

* * * * *